United States Patent Office 3,016,370
Patented Jan. 9, 1962

3,016,370
VINYL PYRROLIDONE-STYRENE
BLOCK POLYMERS
Johann Wolfgang Breitenbach and Helmut Edelhauser, Vienna, Austria, assignors, by mesne assignments, to W. R. Grace & Co., a corporation of Connecticut
No Drawing. Original application Apr. 5, 1955, Ser. No. 499,499. Divided and this application Feb. 1, 1960, Ser. No. 10,529
1 Claim. (Cl. 260—88.1)

It is known that in the normal copolymerization the starting substances enter the polymer in accordance with their concentration in the monomer mixture and their specific reaction velocities. The molecules of the substances to be polymerized are in an irregular arrangement in the polymer chain. It has been attempted to produce copolymers having a more regular structure. To this end short chains were made first in the form of separate prepolymers from the several polymerizable starting substances. The desired length of chain or degree of prepolymerization had to be adjusted by an appropriate control based on physical tests. The resulting prepolymers, which contained only molecules of a certain average chain length, were then activated by making the several molecule chains reactive at their ends. These activated prepolymers were then copolmerized to obtain a copolymer, in which the short chains, each of which consists of identical molecules, are linked together in alternation.

It is apparent that that known procedure involves extreme difficulties in practice. To obtain the desired copolymers having a regular structure (block polymers), the conditions required for the several process steps must be investigated most carefully and the reactants must be specially selected. This is so because it depends, e.g., primarily on the selected starting material whether the afore-described activation is possible at all. On the other hand it may easily occur that the prepolymer continues its own polymerization during the activation so that the desired activated prepolymer which is suitable for copolymerization is not at all obtained. Moreover, it has been possible only in single cases to find copolymers whose properties permit of the conclusion that the copolymerization in the aforedescribed manner has led to a polymer which is composed of alternating chain portions consisting of the several components.

The present process relates to a much simpler procedure for making copolymers having a more regular structure. The process is based on the following consideration: When the substances in a polymerization mix mixture form a molecular dispersion in the homogeneous mixture, the continual addition of a third substance, in which one of the polymerants is extremely well soluble whereas the other one is difficultly soluble, will finally cause segregation. Before that segregation is visible, aggregations of the third substance with the well soluble polymerant, on the one hand, and aggregations of the difficultly soluble polymerant alone, will be formed. In this manner short chains of the several polymerants are so to speak pre-formed in the monomer mixture. When the polymerization is now initiated the resulting polymer chain must contain in alteration chain portions containing only the one polymerant and chain portions containing only the other polymerant, because in one aggregation only monomer molecules of the one polymerant will be available for the growth of the chain, until the polymerization passes over to another aggregation where only monomer molecules of the other polymerant are available for the growth of the chain.

According to the invention a block polymer is obtained by forming a homogeneous mixture of two or several polymerizable substances and at least one substance in which only one or only part of these polymerizable substances is very well soluble, and polymerizing that mixture in a manner known per se. This procedure leads quickly and with high reliability of operation to copolymers which have new valuable properties and can be processed to form foils, synthetic fibres, etc. A special advantage resides in the fact that technical articles made from such copolymers have reduced electrostatic properties, and an increased swelling capacity with permeability for water vapour.

Though it is not essential, it may be of advantage to add a starter to the polymerization mixture before the polymerization is carried out. Substances acting as starters e.g. azoisobutyric acid nitrile, can be added to the polymerization mixture in small quantities, e.g. 0.2–0.5%. In this connection it is not essential in what sequence the starters are mixed with the components of the polymerization mixture.

In a special mode of carrying out the invention the homogeneous mixture of two or several polymerizable substances has added thereto in a concentration below the segregation limit at least one substance in which only one or only part of these polymerizable substances is very well soluble. Thus the homogeneous system is maintained. The resulting mixture is polymerized in a known manner. Copolymers thus produced exhibit a much higher interfacial activity than copolymers produced only by polymerizing the polymerizable starting materials, without the addition of another substance, taught by the invention. Especially water has proved advantageous as an addition.

Groups of substances which have been found particularly suitable for carrying out the process according to the invention, are, e.g., N-vinylpyrrolidone, vinylchloride and water, N-vinylpyrrolidone, styrene, water and, if desired, urea; and styrene, acrylic acid and water.

In the scope of the invention a claim is further made for a polymerization mixture which forms a homogeneous mixture of two or several polymerizable substances and at least one substance in which only one or part of these polymerizable substances is very well soluble. Such polymerization charge can be prepared as such, without requiring the polymerization to follow immediately. The mixture can be stored and shipped over long distances. Thus the plastics manufacturer receives only the polymerization mixture. He adds thereto a starter and other desired substances, such as dyes, fillers, softeners etc. and the resulting mixture is then polymerized in a known manner. It is obvious that such known additions to the polymerization mixture may be made before it is stored and shipped. No starter must be added to the mixture before it is shipped, of course. For this reason the invention relates also to such polymerization mixtures, which contain known dyes, fillers, softeners, etc. Suitable polymerization mixtures are, e.g.: N-vinylpyrrolidone, vinylchloride and water; N-vinylpyrrolydone, styrene, water, and, if desired, urea; styrene, acrylic acid and water.

Details of such polymerization mixture and the production of the polymers from such mixtures are apparent from the following examples, though the invention is not restricted to said examples. The solubility of the copolymer and the reduction of the interfacial tension between water and benzene by the copolymer were used as characteristics indicating the regular structure of the copolymer. The interfacial activity increases with an increasing regularity of structure.

EXAMPLE 1

In an apparatus which is completely closed against the atmosphere, in view of the volatility of vinylchloride, 402 grams (3.6 moles) N-vinylpyrrolidone and 32.4 grams (1.8 moles) water were mixed homogeneously and 0.5 gram ($3 \times 10^{-3}$ mole) of azoisobutyric acid nitrile was added as a starter. 62.5 grams (1 mole) of vinylchloride were added by distillation from a storage vessel gas-tightly connected to the closed apparatus. Thus a homogeneous mixture was formed. The vessel containing the complete polymerization mixture was cooled with liquid air and was fusion-sealed in a cooled condition in a high vacuum and then heated in a water bath to 50 deg. C. Thus a copolymer was obtained in the vessel, containing 1.4 mole of N-vinylpyrrolidone per 1 mole of vinylchloride and being 80% soluble in water.

A polymer of the same composition, 1.4 moles of N-vinylpyrrolidone per mole of vinylchloride, may be obtained also by polymerizing the monomer components without addition of water. To this end a polymerization mixture of 1.7 moles of N-vinylpyrrolidone and 1 mole of vinylchloride must be prepared and polymerized after a starter has been added as described hereinbefore. A water solubility test of the polymer thus formed has shown that the same is 100% water-soluble, i.e. completely soluble in water, contrary to the polymer obtained with an addition of water.

With a larger addition of water, viz. from a polymerization mixture containing 1.9 moles of N-vinylpyrrolidone, 1 mole of vinylchloride and 1.9 moles of water, a copolymer of the above composition is obtained which is 86% water-soluble.

The solubility values of the resulting copolymers in water, for a charge of 1 gram per litre, for the different mixing ratios of the reactants, as borne out by the tests, are shown on Table 1.

*Table 1*

|  | The copolymers were made— | | | | | |
| --- | --- | --- | --- | --- | --- | --- |
|  | Without addition of water | | | With addition of 0.5 mole of water per mole of N-vinyl-pyrrolidone | | With addition of 1 mole of water per mole of N-vinyl-pyrrolidone |
| Molar ratio N-vinylpyrrolidone to vinylchloride in the mixture | 1.297 | 1.988 | 3.952 | 3.618 | 1.924 | 3.803 |
| Molar ratio of N-vinylpyrrolidone to vinylchloride in the polymer | 1.18 | 1.72 | 2.95 | 1.428 | 1.428 | 2.858 |
| Molar percentage of vinylchloride in the polymer | 45.87 | 36.76 | 25.32 | 41.19 | 41.19 | 25.92 |
| Water soluble part of the copolymer, percent | 100 | 100 | 100 | 80 | 86 | 96 |

The lower solubility is a measure of the higher degree of order in the structure of the copolymers. It is apparent that the copolymers produced with an addition of water are much less soluble in water than would correspond to their composition in the case of an irregular structure. As a result the optimum of the effect of formation of block-polymers is obtained with an addition of 0.5 mole of water per mole of N-vinylpyrrolidone, whereas the effect becomes smaller if 1 mole of water is added to the polymerization mixture per mole of N-vinylpyrrolidone. The insoluble part of the copolymer made with an addition of 0.5 mole of water per mole of N-vinylpyrrolidone is 20% and shows no swelling in water, whereas in a copolymer of the same composition made with an addition of 1 mole of water per mole of N-vinylpyrrolidone, the insoluble part is only 14% and shows a very strong swelling in water.

If desired the copolymers produced according to the process of the invention may be dehydrated by drying because the water has not participated in the polymerization reaction.

EXAMPLE 2

In the same manner as described in Example 1 a homogeneous mixture of 934 grams (8.4 moles) N-vinylpyrrolidone, 62.5 grams (1 mole) vinylchloride, 151.4 grams (8.4 moles) water, and 1.3 grams ($8 \times 10^{-3}$ gram) azoisobutyric acid nitrile, was prepared and polymerized.

For comparison an equivalent polymerization mixture was polymerized without addition of water.

The percentage reduction of the interfacial tension in the system water-benzene by the resulting copolymers at a concentration of 1 gram per liter of water is shown in Table 2.

*Table 2*

|  | The copolymers were produced— | |
| --- | --- | --- |
|  | Without addition of water | With addition of 1 mole of water per mole of N-vinylpyrrolidone |
| Molar ratio of N-vinylpyrrolidone to vinylchloride in the mixture | 9.406 | 8.414 |
| Molar ratio of N-vinylpyrrolidone to vinylchloride in the polymer | 6.27 | 6.374 |
| Molar percentage of vinylchloride in the polymer | 13.75 | 13.56 |
| Percentage reduction of the interfacial tension | 58.6 | 86 |
| Viscosity number, cu. cm/gm | 72 | 81 |

From the values of Table 2 it is apparent that with the same composition and approximately the same chain length (viscosity number) the copolymer produced with an addition of water has a much higher interfacial activity than the copolymer produced without addition of water. It has a viscosity number of 81 cu.cm./gm. and in a concentration of 1 gram per litre of water reduces the interfacial tension between water and benzene by 86%.

A copolymer of the same composition, obtained without an addition of water in the polymerization mixture, has a viscosity number of 72 cu. cm./gm. In a concentration of 1 gram per litre of water it reduces the interfacial tension between water and benzene only by 58%.

The higher interfacial activity of the polymer produced with an addition of water is a particularly clear evidence of its regular structure. With the copolymers produced with an addition of water the saturation value of Gibbs' interfacial concentration calculated from the dependence of the interfacial tension on concentration, is about six times higher than with the copolymer produced without addition of water.

These results may be explained theoretically with the fact that in the copolymers produced without addition of water the N-vinylpyrrolidone and vinylchloride chain members are in an irregular arrangement in the polymer chains whereas in the copolymers produced with an addition of water they are arranged with a higher degree of regularity so that short parts of the chain consist only of N-vinylpyrrolidone or only of vinylchloride.

EXAMPLE 3

A polymerization mixture was obtained by homogeneous mixing 52 grams (0.5 mole) styrene, 111 grams (1 mole) N-vinylpyrrolidone and 9 grams (0.5 mole) water. That mixture was stable and capable of being stored. After an addition of 0.6 gram ($1 \times 10^{-3}$) azoisobutyric acid nitrile and some dyestuff that polymerization mixture was polymerized at 50 deg. C. while excluded from the air, in the manner described in Example 1.

The resulting copolymer contains 8.6 moles of styrene per one mole of N-vinylpyrrolidone. In a concentration of 1 gram per litre of benzene it reduces the interfacial tension water-benzene 78%.

Without addition of water the same polymerization mixture gives a copolymer containing 9.1 moles of styrene per 1 mole of N-vinylpyrrolidone, which reduces the interfacial tension water-benzene only by 30% in a concentration of 1 gram per litre of benzene.

When 0.6 gram (0.1 mole) of urea is added beside the water to the same polymerization mixture, the resulting copolymer has the same composition but increased interfacial activity. In a concentration of 1 gram per litre of benzene the interfacial tension water-benzene is reduced by 84%. Thus the ordering effect of water in the polymerization mixture can be increased by an addition of urea.

The favourable effect of the addition of water is apparent even more clearly from the following Table 3.

Table 3

[Copolymerization of styrene and N-vinylpyrrolidone. Percentage reduction of the interfacial tension in the system water-benzene by the copolymers in a concentration of 1 gram per litre of benzene]

|  | The copolymers were produced— | | | | |
| --- | --- | --- | --- | --- | --- |
|  | Without addition of water | | | With an addition of ½ mole of water per mole of N-vinylpyrrolidone | |
| Molar ratio of styrene to N-vinylpyrrolidone in the mixture | 1 | 0.5 | 0.2 | 1 | 0.5 |
| Molar ratio of styrene to N-vinylpyrrolidone in the polymer | 12.8 | 9.1 | 2.1 | 11.7 | 8.6 |
| Molar percentage of styrene in the polymer | 92.8 | 90.1 | 67.3 | 92.1 | 89.5 |
| Percentage reduction of interfacial tension | 19.3 | 30.0 | 57.0 | 63.6 | 77.8 |
| Percentage reduction of the interfacial tension after addition of 1/10 mole of urea per mole of N-vinylpyrrolidone |  |  |  | 72.4 | 83.7 |

EXAMPLE 4

A stable polymerization mixture capable of being stored was produced from 104 grams (1 mole) styrene, 36 grams (0.5 mole) of acrylic acid and 2.7 grams (0.15 mole) of water by a simple mixing of the monomeric polymerization components to form a homogeneous mixture. After 0.25 gram ($1 \times 10^{-3}$ mole) of benzoyl peroxide had been added as a starter the polymerization was effected at 60 deg. C. to the exclusion of oxygen.

The resulting copolymer contained 0.45 mole of acrylic acid per mole of styrene and reduced the interfacial tension water-benzene by 57% in a concentration of 1 gram per litre of water.

Without addition of water the same polymerization mixture gives a copolymer which contains 0.43 mole of acrylic acid per mole of styrene and reduces the interfacial tension water-benzene only by 28% in a concentration of 1 gram per litre of water.

The favourable effect of the addition of water is even more clearly apparent from the following Table 4.

Table 4

[Copolymerization of acrylic acid and styrene. Percentage reduction of the interfacial tension in the system water-benzene by the copolymers in a concentration of 1 gram per litre of water]

|  | The copolymers were produced— | | | |
| --- | --- | --- | --- | --- |
|  | Without addition of water | With an addition of water (moles of water added per mole of acrylic acid) | | |
|  |  | 0.2 | 0.3 | 0.4 |
| Molar ratio of acrylic acid to styrene in the mixture | 0.5 | 0.5 | 0.5 | 0.5 |
| Molar ratio of acrylic acid to styrene in the polymer | 0.43 | 0.46 | 0.45 | 0.41 |
| Molar percentage of acrylic acid in the polymer | 30.1 | 32.1 | 31.4 | 28.6 |
| Percentage reduction of interfacial tension | 28.3 | 45.5 | 57.1 | 51.2 |

This is a divisional application of our application Serial No. 499,499, filed April 5, 1955.

What we claim is:

In the process for producing a copolymer of N-vinyl pyrrolidone and styrene comprising homogeneously mixing N-vinyl pyrrolidone, styrene, and water in a mol ratio varying from 1 to 2 mols of N-vinyl pyrrolidone per mol of styrene, the N-vinyl pyrrolidone:water mol ratio being 2:1, and polymerizing the said homogeneous mixture in the absence of atmospheric oxygen with a polymerization catalyst of azobutyric acid nitrile in a concentration of about 0.35%, the improvement comprising carrying out the polymerization with homogeneously admixed urea, the N-vinyl pyrrolidone:urea mol ratio being 1:0.1, whereby there is obtained a copolymer of N-vinyl pyrrolidone and styrene having a lower interfacial tension between benzene and water than the product polymerized in the absence of urea.

References Cited in the file of this patent

UNITED STATES PATENTS 2,471,959    Hunt                  May 31, 1949
2,495,918    Bolton               Jan. 31, 1950